3,810,742
APPARATUS FOR WINDING THERMO
PLASTIC STRANDS
Jerome P. Klink and Phra D. Lyle, Granville, and
Norman R. Shape, Columbus, and Alex P. Symborski,
Newark, Ohio, assignors to Owens-Corning Fiberglas
Corporation, Toledo, Ohio
Filed Sept. 6, 1972, Ser. No. 286,626
Int. Cl. C03b 37/02
U.S. Cl. 65—11 W                         24 Claims

ABSTRACT OF THE DISCLOSURE

Apparatus for processing linear material such as glass strand that includes means for linearly feeding the material and means for receiving the fed material, means for sensing the differences between the rate of linear feed and collection of the material during a change in linear speed of the material, first control means responsive to the sensed differences to modify the speed of the feed means to bring the rate of feed of the material into conformity with the rate of collection, second control means for matching the linear rate of feed and collection of the material during time the first control means is not in operation, and means for switching between the two controls.

BACKGROUND OF THE INVENTION

This invention relates to production of continuous filaments of a thermoplastic material and more particularly to improvements for producing such filaments where production apparatus uses mechanical attenuation of filaments from streams of heated thermoplastic material. The invention is especially useful in producing continuous glass filaments and strands of these filaments.

Normally heated thermoplastic materials such as molten glass are drawn into continuous filaments from streams flowing from a feeder holding a body of the heated material. Usually apparatus attenuates the streams into individual continuous filaments and combines them into a bundle or strand under the influence of pulling forces exerted directly by a winder. The winder collects the strand into a wound package on a collection tube mounted on a driven rotatable collet. The winders commonly used can collect strands at linear strand speeds up to 10,000 to 15,000 feet per minute or more.

This well known process has inherent shortcomings that influence the filaments, strands and wound packages. For example, the production apparatus uses the winding package itself to provide the attenuating forces. Consequently, repeated wraps of strand on the package with high strand tension gradually builds-up an increasing inward compressive force on the package. This compressive force can crush filaments and buckle interior strand layers. Then too, tension in the strand can "bury" strand by squeezing strand portions of overlying layers between and below strand portions of underlying layers. The "buried" strand can not be freely withdrawn from the package; the entangled strand breaks. Also, the gradual build-up of the winding package effects changes in the strand collection speed for a given rotational speed of the winding collet. The build-up of a package increases its diameter and consequently its circumference. And circumferential surface speed of a winding package equals package circumference times the angular speed of the package. Hence, for a given angular collet speed the strand collection speed (and filament attenuation speed) during package build-up increases towards a maximum speed at the end of a package cycle. Under these conditions the filaments are smaller in diameter at the end of a package cycle than they are at the beginning of the cycle. Some packages collect strand for 60 minutes or more. Thus, speed differences (and hence filament diameter differences) can be considerable.

There have been attempts to overcome the difficulties. For instances, special complex collets have been made to apply an outward force against the inward compressive forces of a winding package. Such collets made package removal from collets easier but do not relieve tension within a package. Consequently, the results have been far from satisfactory.

Efforts have been made to overcome filament diameter non-uniformity in filament forming operations by controlling the viscosity of the streams and by attempting to keep a constant linear strand collection speed by varying the collet speed during formation of a package. However, it has only been practical to make these viscosity and collet speed variations in a linear fashion. But the collection speed variations during package build-up change non-linearly. Thus, prior efforts have not been fully successful.

Efforts have been made to overcome compressive forces in a package from strand tension and to produce uniform-filament diameters by use of pulling wheels rotated at a constant rotational speed. Here the pulling wheels are between a stream feeder and a collecting device. This prior apparatus uses winders that rotate a collecting package on a collet or spindle with only sufficient force to take-up strand as strand is made available to it by the pulling wheel. In these prior arrangements a constant torque or constant horse power motor is normally used to rotate the collet. Increased package size (mass) causes these motors to reduce rotational speed and thus the tension in the collection strands reduces. The apparatus does reduce high strand tensions (compressive forces) in a wound package and produces filaments of uniform tension. But the apparatus does not control tension in a strand.

Further, prior apparatus has lacked stability in high speed strand collection operations. The instability in operation of the apparatus tends to produce linear strand speed variations that jerk strands. Such a situation is particularly harsh on strand in processes using apparatus required to cooperate by matching linear strand speeds. And apparatus producing strand speed changes can be especially disastrous to glass filaments because they are essentially inextensible.

Additionally, apparatus using a strand feeding device together with a device for collecting the fed strand encounter harsh production problems. Like other production processes the apparatus must be kept running under controlled conditions on a substantially continuous basis with a minimum of operator attention. Package doffing time must be short; strand breaks must be kept to a minimum. Accordingly, such apparatus must be extremely versatile in keeping the rates of linear strand feed and collection in matched relationship throughout all phases of a packaging cycle, including start-up and shut down or stoppage of the apparatus between packages. But prior apparatus has not addressed itself to these difficult production problems.

SUMMARY OF THE INVENTION

An object of the invention is improved method and apparatus for forming continuous filaments from heated thermoplastic filament forming material such as molten glass;

Another object of the invention is improved method of and apparatus for forming continuous filaments from heated thermoplastic filament forming material, such as molten glass, and subsequently combining the filaments into a strand and collecting the strand into a wound package at a selected tension.

Another object of the invention is improved method of and apparatus for matching strand collection speed with a strand feed speed throughout the complete cycle of collecting a wound strand package.

Yet another object of the invention is improved method of and apparatus for matching the rate of linear strand feed with the rate of linear strand collection during short changes in strand speed in comparison to the time for package formation, such as at the beginning and ending of a packaging cycle.

Still another object of the invention is improved method of and apparatus for processing linear elements.

The above and other objects are attained by apparatus for and method of processing linear material that includes two control means, a primary and secondary control means, used with means for linearly feeding linear material and means for collecting the fed material.

The secondary control means is a short term control employed during a change in the speed of linear material over a short time in which the feed means delievers linear material at a rate greater than the material is collected. The secondary control means is effective in response to sensed differences in the rate of linear feed and linear collection of the material to bring the rate of linear feed into conformity with the rate of linear collection.

The primary packaging control means matches the rate of linear feed and collection of the material over a larger time than the secondary control means does. And in a more specific form the primary control means includes a means for supplying a control signal having a patterned rate of change that is effective to modify the rate of collection during package build-up to cause the linear rate of collection to approach, in general, the linear rate of feed of the material. Further, such means includes means effective in response to sensed differences between the linear rate of feed and linear rate of collection to change the patterned rate of change of the control signal to bring the rate of linear collection of the material into conformity with the actual rate of linear feed of the material.

Hence, in a broad sense, the apparatus includes controls for modifying the linear feed rate of the material to bring the rate of linear feed into conformity with the rate of linear collection during changes in the linear rate of the material over a relatively short time and controls for modifying the linear rate of collection of the material to bring the rate of linear collection into conformity with the rate of linear feed during a longer period of time.

Further, the objects embrace use of apparatus for packaging linear material into a wound package that keeps linear material traversing apparatus in predetermined spaced relationship with packages during collection of the packages.

Other objects and advantages will become apparent as the invention is described more clearly in detail with references made to the accompanying drawings.

DESCRIPTION OF THE DRAWINGS

FIG. 1 is a front elevation view of apparatus embodying the principles of the invention. FIG. 1 shows a continuous glass filament forming operation where a filament pulling device attenuates glass filaments and a take-up winder collects glass strand as a wound package.

FIG. 2 is a side elevation view, partially in section, of the apparatus shown in FIG. 1. The section is taken along lines 2—2 in FIG. 1.

DESCRIPTION OF THE PREFERRED EMBODIMENTS

The method and apparatus of the invention are particularly valuable in processes of forming filaments from heat softened fiber forming mineral material such as molten glass where temperature and filament processing speeds affect filament diameter. Yet, method and apparatus embodying the principles of the invention are also useful in processing and packaging bundles of textile filaments made from other thermoplastic filament forming materials. Thus the disclosed glass filament forming operation is only an example used to explain the operation of the invention. The invention has wider application in a variety of filament forming operations and processing operations for linear material generally.

Figures 1, 2:
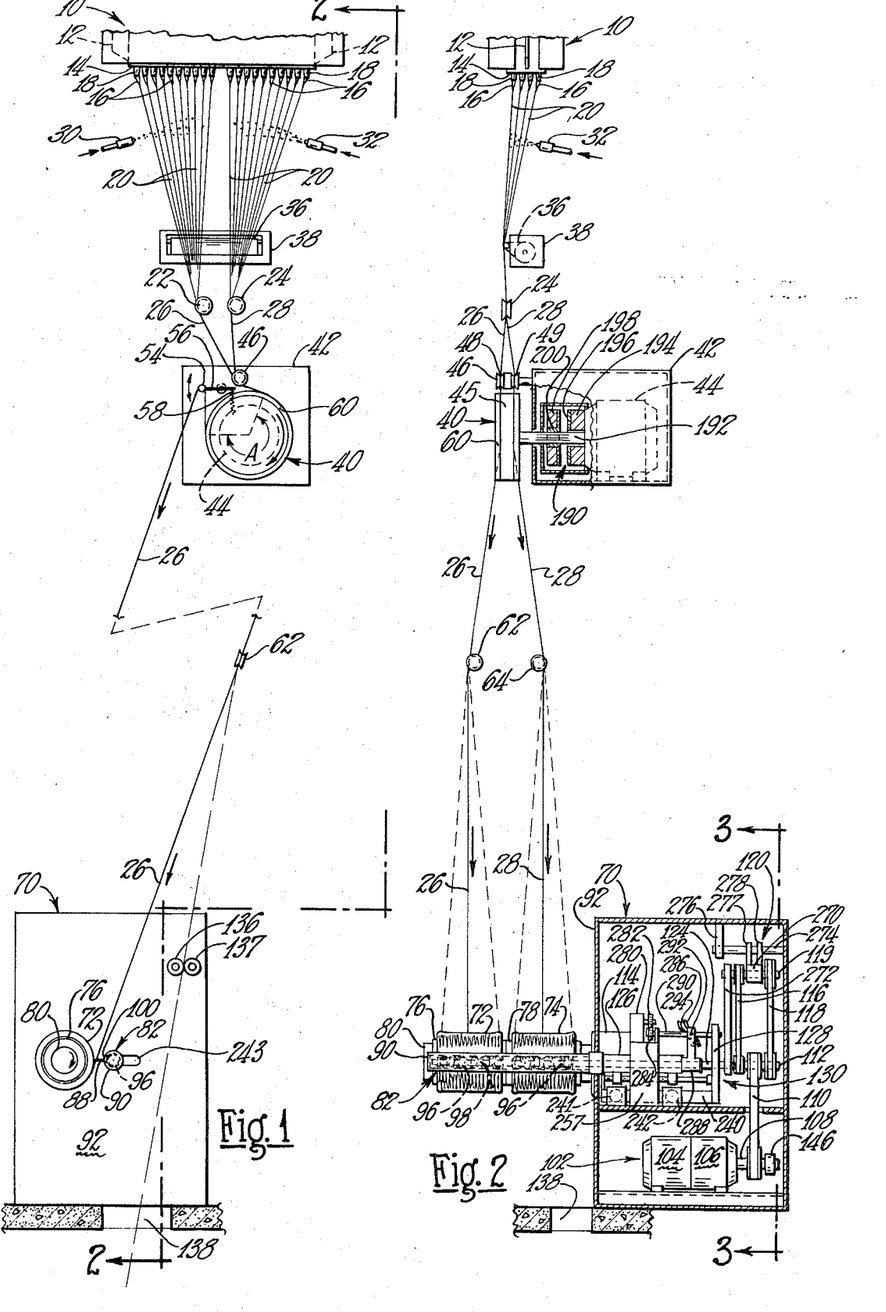

FIGS. 1 and 2 show continuous glass filament forming apparatus embodying the principles of the invention; the apparatus is shown in operation during package build. The embodiment uses a rotary filament pulling device to form continuous glass filaments at a constant filament forming speed. Further, the apparatus, as shown, combines the filaments into two untwisted filament bundles or strands and collects the strands below the rotary pulling device at selected strand tension. Normally such strand tension is less than the sum of the tensions in the filaments above the rotary pulling device. The filament pulling device is below a source of molten glass streams from which the glass filaments are drawn and between the filament collecting device and a collecting winder. Hence, the filament pulling device isolates or separates the glass filament forming tension in the filaments above the device from the filaments collected as strands below the device. A predetermined or selected tension, normally in the range of from 30 to 200 grams, is introduced into the glass strands between the filament pulling device and the collecting winder. The filament pulling device feeds the strands to the collecting winder.

The apparatus includes two controls for matching the rate of linear strand feed and linear strand collection. One of the controls is used over a short time in comparison to the over all packaging time, primarily at the beginning and ending of a strand packaging cycle, to match the rate of linear strand feed with the rate of linear strand collection. The other control is used during formation of a wound package; this packaging control normally matches the rate of linear strand collection with the rate of linear strand feed throughout the packaging cycle of the apparatus except for the beginning and ending moments.

The embodiment shown collects two packages; however, one can use the apparatus of the invention to collect one package or more than two packages.

FIGS. 1 and 2 illustrate a container or feeder 10 that holds a body of molten glass. The feeder 10 can receive a continuing supply of molten glass by several known ways. For example, a forehearth can supply molten glass to the feeder 10 from a furnace heating batch materials to molten glass. Also, a melter associated with the feeder 10 can supply molten glass to the feeder by reducing glass marbles to a heat-softened condition. At the ends of the feeder are terminals 12 that connect to a source of electrical energy to heat the feeder 10 by conventional resistance heating. Such heating keeps the molten glass in the feeder 10 at proper fiber-forming temperatures and viscosities. The feeder 10 has a bottom 14 with orifices or passageways for delivering streams 16 of molten glass from the feeder 10. As shown depending orifices projections or tubular members 18 define the openings in the bottom 14.

The feeder 10 is normally made of platinum or an alloy of platinum.

The molten glass streams 16 are attenuated downwardly into individual continuous glass filaments 20. Gathering shoes 22 and 24 below the feeder 10 combine the continuous glass filaments 20 into two bundles or strands 26 and 28 respectively.

Normally apparatus applies both water and a liquid sizing or other protective coating material to the filaments 20. As shown nozzles 30 and 32 adjacent to the bottom 14 of the feeder 10 direct water spray onto the continuous glass filaments 20 before the shoes 22 and 24 combine the filaments 20 into the glass strands 26 and 28.

A sizing applicator 36 supported within a housing 38 just above the gathering shoes 22 annd 24 applies a liquid sizing or other coating material to the swiftly traveling continuous glass filaments 20. The applicator may be any suitable type of applicator known to the art; however, the applicator 36 is shown as an endless belt moved through liquid held in the housing 38. As the continuous glass filaments 20 speed in touching relationship across the surface of the moving endless belt applicator 36, some of the liquid on the surface transfers to them.

During package formation a pulling wheel 40 attentuates the continuous glass filaments 20 at a constant speed from the molten glass streams 16 supplied by the feeder 10. The pulling wheel 40 is rotatably mounted on a housing 42 located just below the shoes 22 and 24. A motor 44 within the housing 42 rotates the pulling wheel at a constant high angular speed. In practice the motor 44 is a single phase induction motor.

The pulling wheel 40 is normally about 12 inches in diameter. The motor 44 can rotate the wheel 40 sufficiently fast to withdraw the continuous glass filaments 20 from the streams 16 at linear speeds up to 12,000 feet per minute and faster.

As shown in FIGS. 1 and 2 the strands 26 and 28 proceed from the shoes 22 and 24 over a strand alignment shoe 46 having circumferential grooves 48 and 49 into contact with a smooth circumferential surface 45 of the pulling wheel 40. The shoe 46 aligns the paths of the traveling strands for spaced apart mutually parallel relationship on the smooth circumferential surface 45 of the pulling wheel 40, the strands being disposed substantially parallel to the circumferential center line of the pulling wheel 40. In FIG. 1 the strands 26 annd 28 come into contact with the pulling wheel 40 at the right hand side of the wheel 40 and leave the wheel at its left hand side.

The alignment shoe 46 is above the pulling wheel 40.

From the pulling wheel 40 the strands 26 and 28 advance upwardly and turn over the top of a spool or roller 54 rotatably mounted on the end of an arm 56. The arm 56 is pivotally mounted on the housing 42. In FIG. 1 the roller 54 and arm 56 are somewhat above and slightly to the left of the pulling wheel 40. A spring 58 within the housing 42 biases the arm 56 in a clockwise direction as viewed in FIG. 1. The biasing force of the spring 58 introduces selected tension into the traveling strands 26 and 28. The introduced tension is selected to permit the build of desired stable wound packages.

The locations of the alignment shoe 46 and the roller 54 promote non-slipping engagement between the wet traveling strands 26 and 28 and the speeding peripheral surface 45 of the pulling wheel 40. Normally an engagement of the strands along from 60 to 80 percent of the length of the peripheral surface 45 is sufficient to insure non-slipping engagement between the surface 45 and the wet strands 26 and 28. Angle A in FIG. 1 represents the angular engagement of the strands 26 and 28 along the peripheral surface 45 of the wheel 40. Angle A is normally from 240 to 300 degrees; an angle of from 250 to 280 degrees is normally preferred for pulling wheels having a diameter of 11 to 12 inches.

To promote non-slipping engagement between the wet strands 26 and 28 and the pulling wheel 40, the wheel 40 as shown uses an annular layer 60 of polyurethane. The layer 60 forms the smooth circumferential surface 45 of the wheel 40. At times it can be useful to control the surface finish, e.g. to somewhat roughen the circumferential surface 45, to enhance engagement between the surface and the wet strands.

The diameter of the pulling wheel 40 and the increased non-slipping engagement from a surfacing layer like layer 60 enhances the non-slipping filament pulling capacity of the wheel 40, which can be used in filament forming operations having filament forming tensions as high as 700 grams or higher. Filament forming tension is the total or summation of tension in each of the filaments 20 above the applicator 30.

During formation of the packages the pulling wheel 40 feeds the strands 26 and 28 at a constant linear strand speed to a winder 70 below. The strands travel from the pulling wheel 40 across the roller 54 and strand alignment shoes 62 and 64 to the winder 70.

The winder 70 collects the strands 26 and 28 as essentially identical wound packages 72 and 74 respectively on collectors. These collectors are shown as tubes 76 and 78 telescoped over a spindle or collet 80. A drive within the winder 70 rotates the collet 80.

Strand traversing apparatus 82 of the winder 70 reciprocates the strands 26 and 28 back and forth lengthwise of the packages 72 and 74 (collet 80) to distribute the advancing strands on their respective packages during package formation. Strand movement effected by the strand traversing apparatus 82 is a combination of a fast primary strand reciprocating motion and a slower secondary strand reciprocating motion.

One can better understand the strand traversing apparatus 82 by looking at the apparatus shown in FIGS. 1 through 4. The strand traversing apparatus 82 includes strand guides 88 held in spaced relation adjacent to the packages 72 and 74 by a support arrangement. The guides 88 slide in a slot lengthwise of a horizontally extending tubular cam support housing 90 projecting from the frame 92 of the winder 70. Rotatably mounted within the support housing 90 are identical co-axially joined together cylindrical or barrel cams 96 with surface guide grooves 98. Cam followers 100 connect the strand guides 88 with the grooves 98 of the barrel cams 96. As the cams 96 rotate, the strand guides 88 reciprocate along the slot in the housing 90 lengthwise of the collet 80 (packages 72 and 74). As shown the cam support housing 90 and the cams 88 extend co-axially. And the housing 90 extends in a direction parallel to the collet 80 with its axis in the same horizontal plane with the axis of the collet 80.

As shown the strand guides 88 are hooked at their ends to keep the strands 26 and 28 engaged.

As the cams 96 reciprocate the strand guides 88, the guides reciprocate the strands 26 and 28 lengthwise of the collecting packages 72 and 74.

The winder 70 includes a drive arrangement comprising a motor/clutch 102 within the winder housing 92. The drive arrangement effects rotation of the cams 96 and rotation of the collet 80 at a controlled speed ratio. The desired package design determines the ratio.

The motor/clutch drive 102 includes a constant speed electric motor 104 that drives the rotor of an associated eddy-current clutch 106. The clutch 106 has an output shaft 108. Magnetic forces within the clutch 106 transfer torque from the rotor driven by the motor 104 to the output shaft 108. In practice the motor 104 is in an induction motor.

The motor/clutch 102 is a variable speed drive. In operation the speed of the motor 104 remains constant; however, changes in flux density (magnetic forces) within the clutch 106 vary the amount of the motor's constant speed rotational energy output transferred to the output shaft 108. The greater the flux density the larger is the percentages of motor output transferred to the output shaft 108.

The drive 102 rotates the collet 80 through a non-slipping belt 110 connecting the output shaft 108 with a collet drive shaft 112 above the drive 102. The rotating collet drive shaft 112 rotates the collet 80. The shaft 112 is co-axial with the collet 80 and is rotatably held by a bearing mounting assembly 114.

Rotational energy from the collet drive shaft 112 moves the strand traversing apparatus 82 through non-slipping belts 116 and 118. The belt 116 connects the collet drive shaft 112 and a rotatably mounted idler shaft 119 of an idler assembly 120. The belt 118 connects the idler shaft 119 with a cam drive shaft 124 that connects to and rotates the cams 96. The drive shaft 124 is co-axial of the cams 96 and is rotatably mounted by a bearing support assembly 126 and the vertical end plate 128 of a movable carriage 130.

Figure 3:
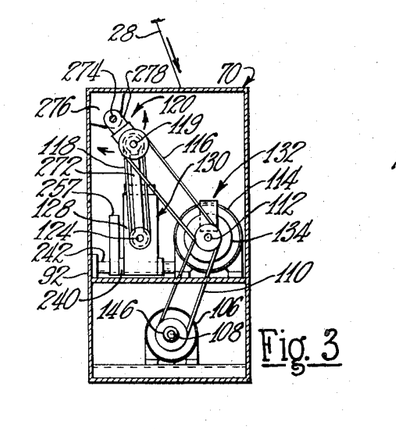
FIG. 3 is a back elevation view in section of the winder shown in FIGS. 1 and 2. The section is taken along lines 3—3 in FIG. 2.
Figure 4:
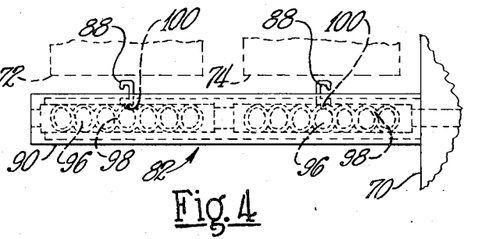
FIG. 4 is a plan view of the strand traversing portion of the winder shown in FIGS. 1 through 3. The dashed lines indicate packages being collected by the winder.
Figure 12:
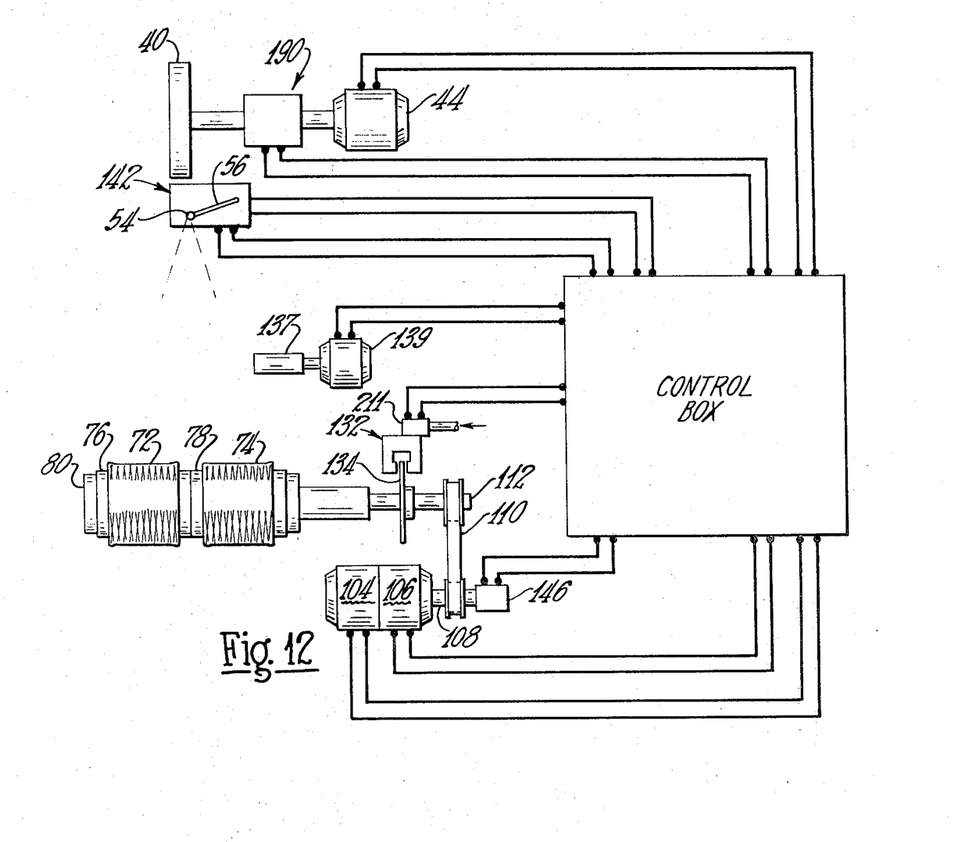
FIG. 12 is a somewhat diagrammatic showing of cooperating elements of the apparatus.

An air operated disc brake assembly 132 is shown with a disc 134 on the collet drive shaft 112 (see FIGS. 3 and 12). The brake 132 is employed to stop the collet 80 at the end of package build.

A pair of rotatable pull rolls 136 and 137 (see FIGS. 1 and 12) are shown for advancing the strands 26 and 28 between packages through a scrap opening 138 in the floor. A motor 139 (see FIG. 12) drives the rolls 136 and 137.

As the packages 72 and 74 build on the rotating collet 80, the diameter of each of the packages increases. And for any given angular collet speed an increase in package diameter increases the speed of the circumferential or axial surface of each of the packages 72 and 74. Hence, the strand collection speed would increase with increasing package diameter if there were no offsetting reduction in the angular speed of the collet 80.

Accordingly, the invention includes means for controlling the angular speed of the collet 80 to offset increases in strand collection speed from increasing package size during strand collection. As shown, these primary or packaging controls modify collect speed through the drive 102. Such controls are effective to maintain a strand collection speed that conforms to the constant strand supply speed from the rotating pulling wheel 40 throughout build-up of the packages 72 and 74.

The packaging controls include means for establishing a control signal effective to modify the rotational speed of the collet 80 in accordance with a patterned rate of change that, in general, will effect a package build-up at a linear strand speed matched to the speed of strand feed. The packaging controls further include means for sensing the differences between the linear rate of supply and linear rate of collection and means effective in response to such sensed speed differences to modify the patterned rate of change of the control signal to bring the linear rate of strand collection into conformity with the actual linear rate of strand supply from the pulling wheel 40 throughout build-up of the packages 72 and 74. The result is a substantially constant linear strand collection speed throughout build of the packages 72 and 74.

In a broad sense, the apparatus includes means for linearly feed linear material and means for receiving the fed material where one of the means (either the feeding means or the receiving means) is predeterminedly variable in its speed during advancement of the material and the other means is to be matched thereto. To effect the matching the apparatus includes control means supplying a control signal having a patterned rate of change that is effective to modify the speed of the matching speed means to approach in general the speed of the predeterminedly variable speed means. Further, the apparatus provides means for sensing the differences between the speeds of the feeding means and receiving means and means effective in response to the sensed speed differences to bring the matching speed means into conformity with the actual speed of the predetermined variable speed means.

Figure 5:
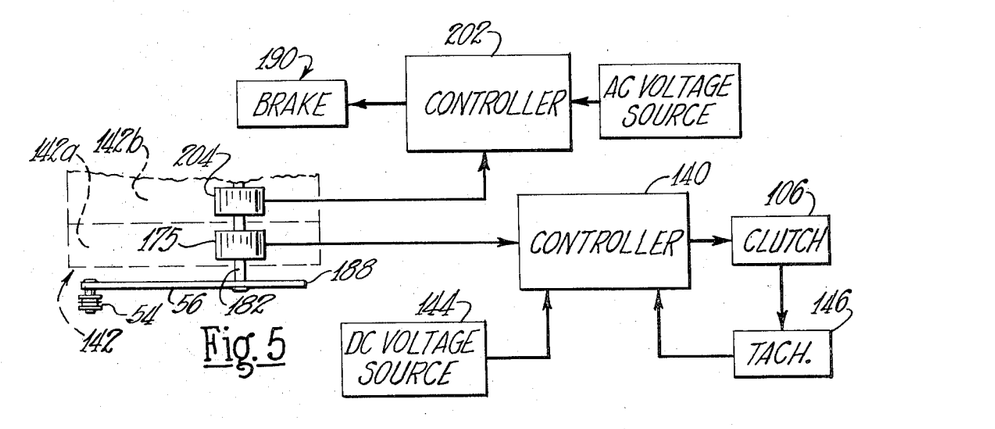
FIG. 5 is a simple flow diagram of primary and secondary control used with the apparatus shown in FIGS. 1 and 2.

FIG. 5 shows a general block diagram embodiment of packaging controls according to the principles of the invention. In the embodiment a controller 140 varies voltage signals to the eddy-current clutch 106 to control the rotational speed of the collet 80 during collection of the wound packages 72 and 74. In the embodiment the controller 140 receives voltage signals from a sensing transducer 142 and receives a constant DC voltage signal from a suitable DC source such as a battery 144. The changing output voltage of the controller 140 controls the magnetic fiield strength of the eddy-current clutch 106 to effectively match the strand collection speed with the strand supply speed as the packages 72 and 74 increase in diameter. For improved stability the controller 140 receives DC feedback voltage signals from a tachometer 146; the tachometer signals are a measurement of the actual angular speed of the clutch output shaft 108 (and hence the collet 80).

Figure 6:
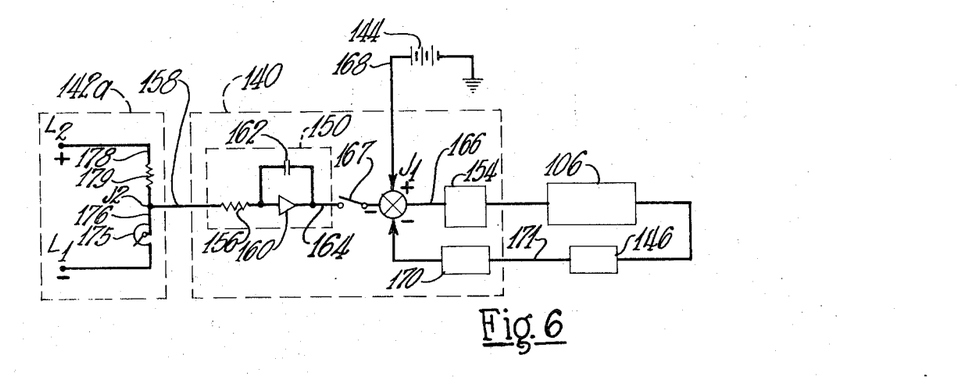
FIG. 6 is a more detailed, but still simplified showing, of the primary controls shown in FIG. 5.

Referring to FIG. 6, the controller 140 includes an integrator 150, a major summing junction $J_1$, and an amplifier 154. The integrator 150 includes resistance 156 in a line 158, an operational amplifier 160 and an integrating capacitor 162 bridged between the input and output of the operational amplifier 160. A line 164 connects the output of the operational amplifier 160 (integrator 150) with the summing junction $J_1$. A line 166 connects the summing junction $J_1$ with the amplifier 154. A package build switch 167 is in the line 164 between the junction $J_1$ and the integrator 150.

The battery 144 supplies a constant voltage to the summing junction $J_1$ through a line 168.

The tachometer 146 supplies its signal to the summing junction $J_1$ through a voltage divider 170, e.g. a potentiometer, in a line 171. The setting of the voltage divider 170 establishes the operating rotational speed of the collet 80 at the start of package build.

The voltage from the summing junction $J_1$ in line 166 is the algebraic summation of all the voltages supplied to the junction $J_1$. As illustrated the voltage applied to junction $J_1$ by the battery 168 is positive; the voltage applied to junction $J_1$ by the integrator 150 is a generally increasing negative voltage; the voltage applied to junction $J_1$ by the tachometer 146 is a negative voltage.

The increasing negative voltage from the integrator 150 reduces the voltage from the junction $J_1$ (the controller 140) throughout the build-up of the packages 72 and 74. Hence, the reducing voltage from the controller 140 correspondingly reduces the rotational speed of the collet 80 during package collection.

The amplifier 154 amplifies the voltage signals from the junction $J_1$ to put then at proper strength for use by the eddy-current clutch 106.

The integrator 150 provides a steadily changing electrical output signal that increases proportionately to the negative time integral of input voltage. Hence, for a given constant input voltage the integrator 150 supplies an output voltage that has a polarity opposite to the input voltage and that builds (increases) linearly with respect to time. Accordingly, for a given constant positive input voltage the output voltage from the integrator 150 increases in a negative direction at a constant rate of change. For different positive input voltages the linear rate of change of the integrator output voltage can be made rapid (a steep slope) with respect to time or made to be slower (a more gradual slope) with respect to time. For example, larger positive integrator input voltages produce higher rates of output voltage change (a steeper slope) in the negative direction.

During package collection the transducer 142 supplies changing input voltages to the controller 140 from a junction $J_2$ through line 174. The junction $J_2$ receives negative DC voltage through a variable resistance such as a rheostat 175 in line 176; negative voltage from a suitable source is applied to the line 176 at $L_1$. The junction $J_2$ receives positive DC voltage in line 178 through a resistance 179; positive voltage from a suitable source is applied to the line 178 at $L_2$. The voltages from $L_1$ and $L_2$ oppose each other. Consequently, there is no input voltage to the controller 140 when the voltages applied to junction $J_2$ are equal and opposite.

In the embodiment shown the transducer 142 includes two sections, indicated by reference numerals 142a and 142b. Section 142a includes the junction $J_2$, rheostat 175, the pivotally mounted arm 56 and its spool or roller 54. The transducer section 142a can be more fully understood by considering FIGS. 7 and 8 together with FIG. 6. As shown the rheostat 175 is on a control shaft 182 within the housing 42. The shaft 182 extends through the wall 184 of the housing 42 and holds the arm 56. The arm 56 is fixed on the shaft 182. Hence, any pivotal movement of the arm 56 moves the shaft 182 about its axis and accordingly modifies the resistance of the rheostat 175.

Figure 7:
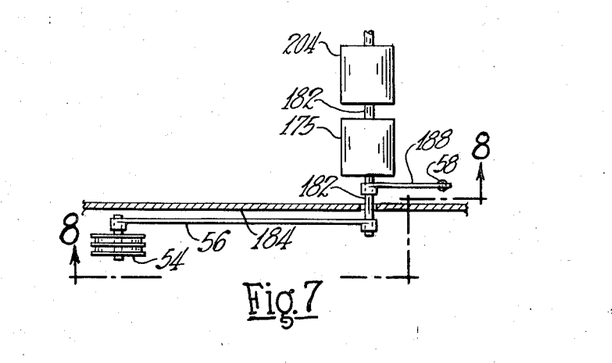
FIG. 7 is a somewhat enlarged plan view of the strand engaging transducer or sensor shown in FIGS. 1, 2 and 5.
Figure 8:
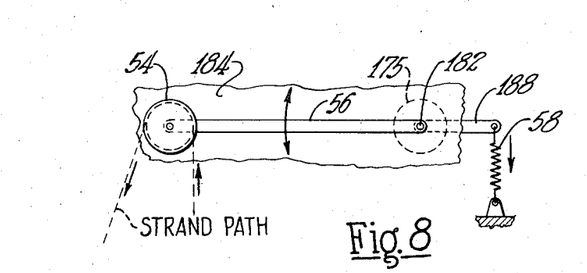
FIG. 8 is a front elevation view of the transducer shown in FIG. 7 and taken along the lines 8—8 of FIG. 7.

The biasing force of the spring 58 urges the arm 56 to pivot about the shaft 182 in a clockwise direction (as viewed in the figures) into the strands 26 and 28 turning on the roller or wheel 54. As shown a lever arm 188 is fixed at one end to the control shaft 182. The lever arm 188 extends from the control shaft 182 in a direction opposite to the arm 56. The spring 58 connects to the lever arm 188 and produces a torque in the control shaft 182 urging the arm 56 into the strands 26 and 28. Thus, the arm 56, shoe 54 and biasing arrangement form a sensor that engages the strands 26 and 28 to sense the relationship between the linear strand collection and feed speeds.

The transducer section 142a has a "no output voltage" position for the arm 56 where no voltage signals flow from the junction $J_2$. In such a position the voltage supplied to the junction $J_2$ through rheostat 175 equals (but is opposite in polarity) the positive DC voltage supplied to the junction $J_2$ from $L_2$. In practice a horizontal position from the arm 56 has provided a satisfactory "no output voltage" position for the transducer section 142a. Other "no output voltage" positions can be used.

As the arm 56 is moved progressively downwardly from the horizontal, the rheostat 175 is arranged to provide smaller negative output voltages to the junction $J_2$. Consequently, an increasing positive voltage is applied to the line 158 as the arm 56 moves progressively downwardly.

When the arm 56 moves above the horizontal position, the size of the voltage applied at $L_1$ is sufficient to provide a negative voltage at junction $J_2$ larger in magnitude than the positive voltage provided from $L_2$. Hence, when the arm 56 is above the horizontal position, negative voltage is applied to the line 158 from the junction $J_2$. Normally the arm remains below the horizontal during package build-up. Thus, the voltage applied to the line 158 is normally positive.

In operation the transducer section 142a senses the relationship between the linear strand feed rate of the pulling wheel 40 and the linear strand collection rate of the winder 70 and includes means that provides a signal in response to the sensed differences between the rate of feed and rate of collection of the material. When the strand collection speed is greater than the strand supply speed, the length of the strands 26 and 28 shortens between the pulling wheel 40 and the packages 72 and 74. Hence the strands 26 and 28 pull the arm 54 downwardly (counter clockwise). The negative voltage at junction $J_2$ becomes smaller. Thus, a larger positive voltage is supplied to the controller 140 from the junction $J_2$. On the other hand, when the strand collection speed is less than the strand supply speed, the length of the strands 26 and 28 increases between the pull wheel 40 and the packages 72 and 74. Hence, the strands 26 and 28, in a sense, develop slack that permits the biasing force of the spring 58 to move the arm 56 upwardly. The negative voltage at junction $J_2$ becomes larger in magnitude. Accordingly, a smaller positive voltage is supplied from the junction $J_2$ to the controller 140.

In operation at the beginning of package build, the axial surfaces of the collectors 76 and 78 and the pulling wheel 40 are brought up to equal speeds as more fully explained hereinafter with the switch 167 open. The switch 167 is closed and the build of the packages 72 and 74 begins. Immediately their diameters begin to increase. And consequently the strand collection speed begins to accelerate beyond the strand supply speed from the pulling wheel 40. Quickly the accelerating strand speed shortens the lengths of the strands 26 and 28 between the pulling wheel 40 and winder 70. The shortening strand length pulls the arm 56 downwardly until the positive voltage from the transducer section 142a to the integrator 150 causes the integrator 150 (controller 140) to provide a control voltage signal having a patterned rate of change with respect to time that reduces the speed of the collet 80 (through the eddy-current clutch 106) in accordance with the build-up of the package at that moment. In this initial equilibrium condition the reducing angular speed of the collet 80 keeps the strand collection speed matched to the strand supply speed from the pulling wheel 40. In other words, the patterned voltage signal from the controller 140 resulting from the initial equilibrium voltage supplied by the transducer 142 is effective initially to keep the collection speed of the strands 26 and 28 equal to the supply speed from the pulling wheel 40.

But the initial voltage output from the controller 140 reduces linearly with respect to time and the build-up of the packages 72 and 74 increases strand collection speed nonlinearly. Hence, the initial linear voltage pattern from the controller 140 (established by the initial equilibrium voltage supplied by the transducer 142) is only in general accordance with the build-up of the packages. Thus, matching strand collection and strand supply speeds is only temporary.

Figure 9:
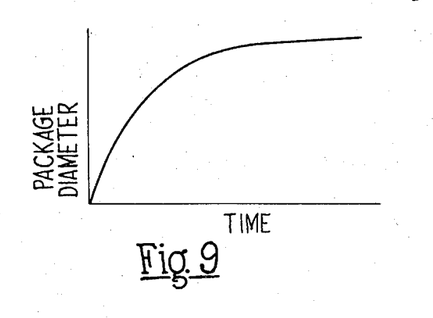
FIG. 9 is a graph showing change in the diameter of a package during collection versus time. The graph generally shows the rate at which a package builds-up during its formation.

Package build is shown in FIG. 9. As one can see the build-up of the packages 72 and 74 is the most rapid when package build begins. Package build-up slows as the packages 72 and 74 become larger in diameter. In practice, it has been found that the changes (increases) in package diameter during package build occur in a complex nonlinear manner having both parabolic and exponential characteristics. Hence, the curve illustrated in FIG. 9 has both exponential and parabolic characteristics.

Hence, the linear voltage slope from the controller 140 (integrator 150) established by the initial equilibrium transducer voltage is steeper than required to keep the strand collection speed equal to the strand supply speed. Therefore, the strand collection speed quickly becomes slower than the strand delivery speed from the pulling wheel 40. Slack develops in the strands 26 and 28 that permits the biasing force of the spring 58 to move the transducer arm 56 upwardly. Such upward movement of the arm 56 reduces the positive voltage from the transducer section 142a until a new equilibrium condition exists. That is, the arm 56 is permitted to move until the slope of the voltage from the controller 140 (integrator 150) matches the rate of collet speed reduction with the rate of package build-up at that moment.

Throughout build of the packages 72 and 74 equilibrium conditions are repeatedly established. In the embodiment shown equilibrium conditions are, for practical purposes, being continuously established. Under such conditions the positive voltage from the transducer section 142a to the controller 140 reduces throughout package build-up and the slope of the controller output voltage continuously changes from an initial steep slope to more gradual slopes.

In a sense one may consider the packaging controls providing instantaneous control voltages changing with instantaneous rates of change matched with instantaneous accelerations in the strands 26 and 28 throughout package build. These packaging control signals are effective to change the patterned rate of change of the control signal to maintain a substantially constant collection speed equal to the strand feed speed from the pulling wheel 40.

The summation of all the instantaneous voltage slopes from the controller section 142a plots a curve in conformity with the curve of diameter change with respect to time as shown in FIG. 9.

If necessary the packaging controls can keep stable operation during times an increase in rotational speed of the collet 80 is needed. Such a situation occurs during times the collection speed is considerably below the feed speed from the pulling wheel 40. Slack in the strands 26 and 28 allows the biasing force of the spring 58 to move the arm 56 above its "no voltage signal" position (above the horizontal). A integrator output signal is reduced. The output voltage from the controller 140 increases, which effects an increasing angular collet speed.

Figure 10:
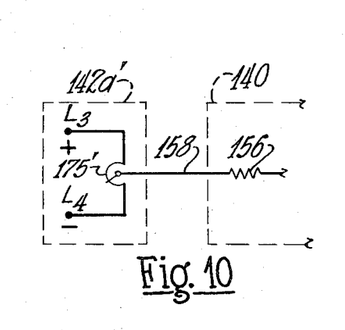
FIG. 10 is a modified transducer arrangement.

Normally, an increase in angular speed of the collet 80 is not necessary. Hence, it is believed possible to use a transducer section $142a'$ as shown in FIG. 10. In the arrangement a potentiometer $175'$ supplies a positive voltage (applied across $L_3$ and $L_4$) directly to the controller 140. A transducer like the transducer section 142a is preferred.

Under some circumstances it may be advantageous to bring the rates of strand collection and delivery into conformity in response to differences between them without changing the patterned rate of change of the control signal. For example, one might regulate the electrical power supply to the clutch 106 (and hence regulate the angular speed of the collet 80) by supplying the signals from means sensing the differences between the rates of strand delivery and collection (e.g. transducer 142) directly to the summing junction $J_1$. Accordingly, the patterned signal from the integrator 150 and the signals from the means sensing the differences between the rates of strand delivery and collection combine the summing junction $J_1$. This variation in the speed control system can be incorporated in the same unit as described above and might be resorted to as desired by operation of a snap switch or alternately might be accomplished automatically such as at the designed limits of operation by changing the patterned rate of change of the control signal.

It is believed possible to use other means for providing a control signal changing generally in accordance with the build-up of packages like packages 72 and 74. For example, one might use an R-C circuit having a condenser-voltage curve for a given voltage changing at a patterned rate generally corresponding to the build-up of the packages. Means such as the transducer section 142a and $142a'$ would supply control signals to the R-C circuit in response to sensed speed differences between the strand supply and collection speeds to modify the reference voltage. Also, one might control the amplifier section of an integrator circuit in response to sensed speed differences effective to modify amplification of an input voltage to provide a changing output signal that effects a constant strand collection speed.

One might use other transducers. For example, one might use a transducer engaging the traveling strands 26 and 28 between the wheel 40 and winder 70 to sense tension as an indication of the differences in the strand delivery and collection speeds. For this purpose one might use a transducer like the transducer disclosed in U.S. Pat. 3,526,130.

The invention envisions a sensor for indicating the differences in strand collection and delivery speeds that does not engage the strands. For example, it is believed possible to use a doppler shift laser to measure differences in the circumferential surface speeds of the pulling wheel 40 and the packages 72 and 74.

The embodiment shown uses the pulling wheel 40 to feed strands at a constant speed to the winder 70; however, the invention envisions other embodiments where the pulling wheel 40 or another strand feeding means supplies strands at various speeds. In such situations the packaging controls operate to match strand collection speed with various strand feed speeds during package formation. Also, the use of the packaging controls for matching the delivery speed of linear material with changing collection speeds of the material, e.g. rotating the collet 80 at a constant angular speed throughout package build.

In operation at the beginning of package formation, the motor 44 is capable of accelerating the pulling wheel 40 from rest to effect a predetermined beginning linear strand speed more quickly than the winder 70 can bring the collet 80 up to speed to effect the predetermined linear strand speed. In other words, the average acceleration of the strands 26 and 28 to the predetermined speed by the pulling wheel 40 is greater than the average acceleration of these strands to such speed by the collet 80. Hence, the apparatus provides secondary controls for keeping the rate of linear strand feed (effected by the pulling wheel 40) in matched relationship with the rate of linear strand collection (effected by the collet 80) during acceleration of the strands 26 and 28 to the predetermined linear strand speed at the beginning of each of the packaging cycles.

These controls are also employed during deceleration of the strands at the ending of package cycles and can be used, if necessary, for short times during package formation.

The secondary controls operate for only a short time compared with the package formation time. In fact, at start up the secondary controls are normally in operation for less than 10 seconds, and usually less than 8 seconds. During these few moments the collet 80 and pulling wheel 40 accelerate in harmony together to effect a predetermined linear strand speed (up to as fast as 10,000 feet per minute and faster).

These short time controls include means for controlling the strand feeding means in response to sensed differences between the rate of linear strand feed and linear strand collection to bring the rate of strand feed into conformity with the rate of strand collection.

Referring to FIG. 2, the secondary controls are shown including means for restraining the feed means to slow the rate of linear strand speed. The restraining means is shown as a magnetically actuated friction brake 190 mounted on the output shaft 192 of the motor 44 in the housing 42. The brake 190 includes a stationary field coil 194, a stationary friction member 196 and a rotatable armature 198 mounted in splines in the external surface of a hub 200. The armature 198 is made of a ferromagnetic substance such as iron. And the hub 200 is secured on and rotates with the output shaft 192. The splines of the hub 200 carry the armature 198 in rotation with the hub (shaft 192); however, the splines allow movement of the armature 198 towards and away from the friction member 196, which is between the armature 198 and the stationary field coil 194.

When the field coil 194 is electrically energized, a magnetic field is established that pulls hte armature 198 against the friction member 196. Larger currents increase the magnetic attraction that urges the armature 198 against the member 196. Hence, when energized the magnetically actuated friction brake 190 inhibits or restrains rotation of the motor 44 to control the angular speed of the pulling wheel 40.

FIG. 5 shows a general block diagram embodiment of the secondary controls together with the primary packaging controls. In the embodiment electrical signals from a control 202 varies current signals to the magnetically actuated friction brake 190. The control 202 receives current signals from the trnasducer section 142b. And the changing current supplied to the brake 190 from the control 202 by sensed differences in the rate of linear strand feed and collection controls the strength of the magnetic flux field of the brake 190 (stationary field coil 194). Such proportionate braking is effective to bring the rate of linear strand feed into conformity with the rate of linear strand collection.

It can be seen from FIG. 5 that the secondary controls use the transducer section 142b, which employs elements common with section 142a. For example, section 142b includes the arm 56, shoe 54, control shaft 182 and spring biasing arrangement that includes the spring 58. As in the case of the transducer section 142a, section 142b engages the strands 26 and 28 to sense the relationship between strand collection and feed speeds. But the section 142b uses resistance changes of a rheostat 204 caused by movement of the control shaft 182, which carries the rheostat 204.

Figure 11:
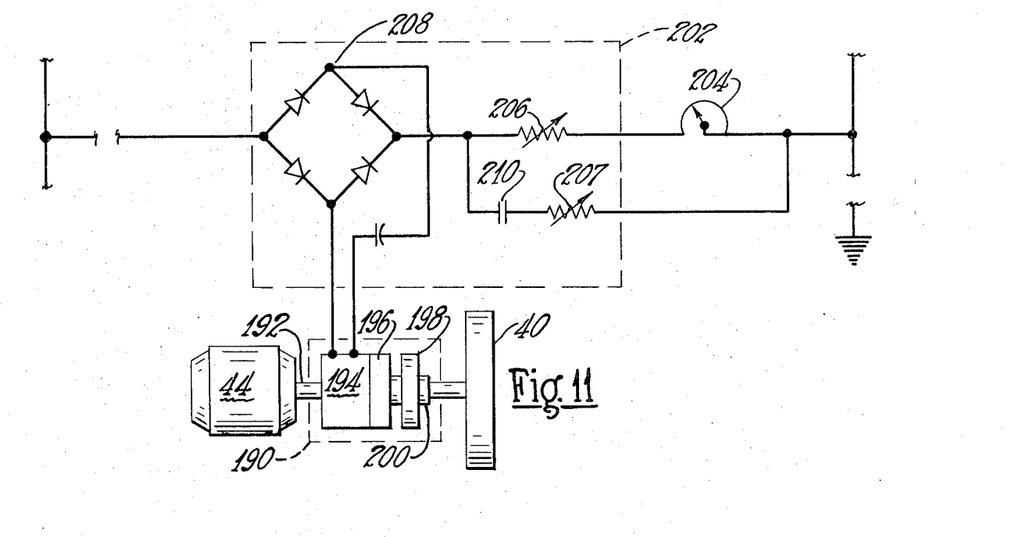
FIG. 11 is a more detailed showing of the secondary controls.
Figure 13:
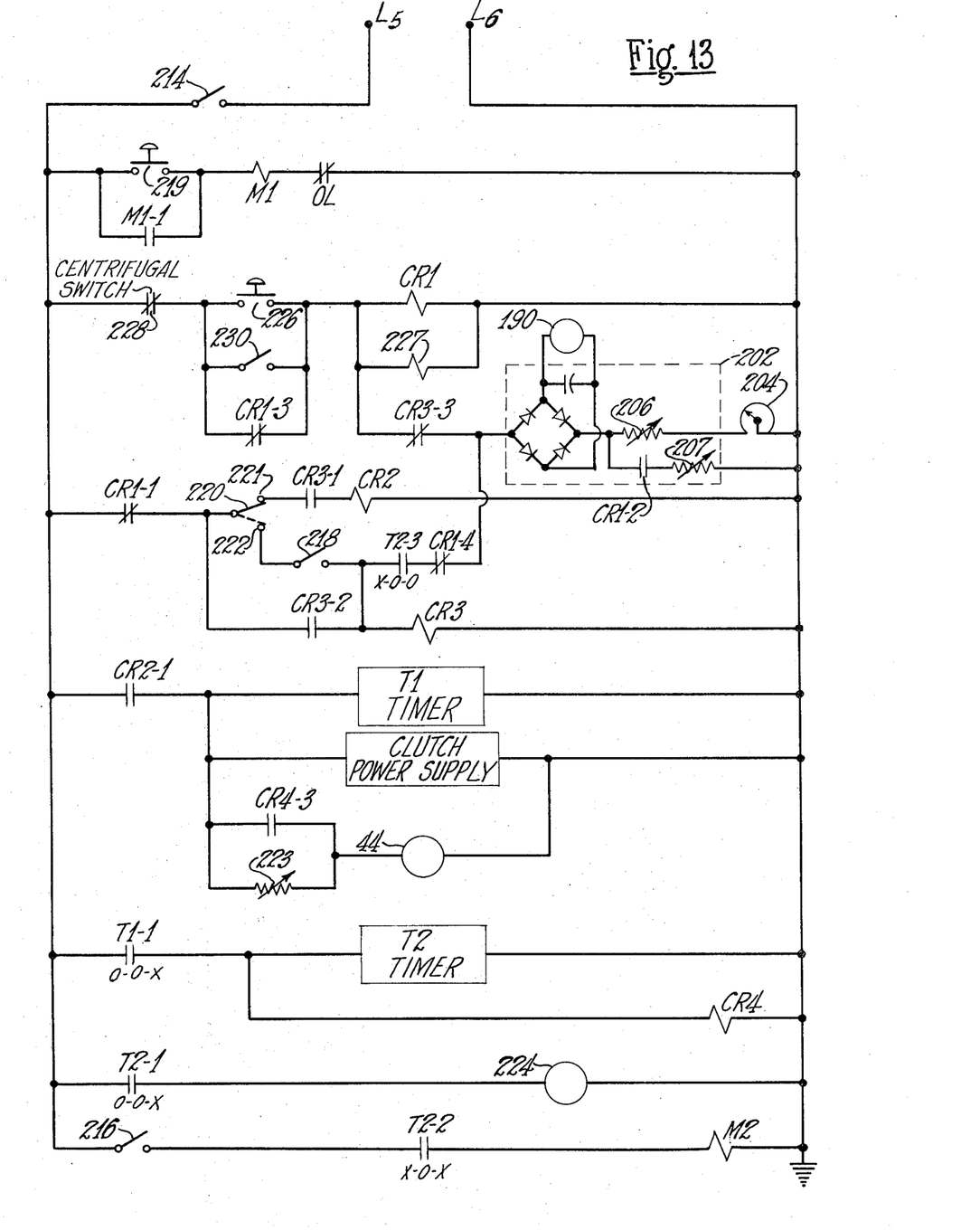
FIG. 13 is an overall control diagram for the apparatus shown in FIGS. 1 and 2.

Referring to FIG. 11, it can be seen that the secondary controls include the rheostat 204 and variable resistances 206 and 207, which are included in the control 202. The control 202 also includes a full wave rectifier 208. As more clearly seen in FIG. 13, commercial AC electrical energy is supplied to the control 202.

The resistance 206 is in series with the rheostat 204. The resistance 207 is in parallel with the rheostat 204 and resistance 206. Contacts 210 (CR1–2 in FIG. 13) are also in parallel with the rheostat 204 and resistance 206 to control operation of the resistance 207.

In practice it has been found desirable to use two levels of braking, i.e. a stronger braking effected by the brake 190 at the end of package build during deceleration of the collet 80 and pull wheel 40. Resistance 206 works together with the rheostat 204 to set a general level of braking at the start-up of the apparatus. The resistance 207 works together with rheostat 204 and resistance 206, upon the closure of contacts 210, at the ending of package build. Hence, the contacts 210 are open at the beginning of the packaging cycle and closed at the ending of the packaging cycle.

The rheostat 204 is arranged to provide progressively larger resistances as the arm 56 moves downwardly under the influence of shortening lengths of the strands 26 and 28 between the pulling wheel 40 and collet 80. Hence, the restraining influence of the brake 190 on the torque of the motor 44 (rotational speed of pulling wheel 40) progressively decreases as the arm 56 is moved downwardly by the strands. Conversely, movement of the arm 56 upwardly progressively increases the restraining or retarding influence of the brake 190 on the torque of the motor 44.

At start-up of the apparatus at the beginning of packaging cycle the switch 167 (see FIG. 6) is open to keep the longer term packaging controls out of operation.

In operation at start-up of each of the packaging cycles, the motor 44 and the motor/clutch 102 are energized together. The clutch 106 is normally fully energized at start-up to apply maximum rotational energy of the motor 104 towards accelerating the collet 80 from rest to a selected speed. At the same time the motor 44 begins to accelerate the pulling wheel 40 from rest speed.

The transducer section 142b senses the length of the strands 26 and 28 between the pull wheel 40 and collet 80 as an indication of differences between the rate of linear strand feed and strand collection. The arm 56 moves until a condition is established where the rate of linear strand feed conforms to the rate of linear strand collection.

In practice it has been useful to reduce the voltage applied to the single phase induction motor 44 to reduce the strength of its torque, and hence its acceleration and operating speed, during start-up. Under these conditions the collet 80 can initially accelerate from rest more rapidly towards the predetermined beginning operating speed than the pull wheel 40. Thus, initially the accelerating collet 80 can collect the strands 26 and 28 at a rate faster than the pulling wheel 40 feeds the strands. The tension applied to the strands during such a condition is sufficiently small to preclude parting of the strands. Hence the strands 26 and 28 (through the rotational energy of the collet 80) can add rotational energy to the rotating pulling wheel 40. Such a condition would usually occur early in start-up when the pulling wheel 40 is being accelerated more slowly. Under these conditions the secondary controls are arranged to provide no braking or only slight braking on the pulling wheel 40. The condition also occurs towards the end of start-up.

As the motor 44 increases its rate of rotational acceleration, the pulling wheel 40 catches up to the angular speed of the collet 80 and attempts to feed the strands 26 and 28 faster than the collet 80 can collect them. Hence, the length of strands 26 and 28 between the pulling wheel 40 and the collet 80 increases. And the arm 56 moves upwardly until braking occurs that establishes a condition where the rate of linear strand feed conforms to the rate of linear strand collection.

Changes in braking rapidly occur repeatedly in response to sensed differences in the linear strand feed and collection speeds during the few seconds at start-up to keep the linear strand feed and strand collection speeds in conformity.

Under conditions of reduced voltage applied to the motor 44, the operating speed of the motor 44 (pulling wheel 40) is slightly less than its predetermined operating speed. Hence, just before the primary controls take over the rotating collet 80 pulls the strands 26 and 28 to the predetermined linear strand speed. This procedure is used to ensure a smooth change-over from secondary to primary controls.

At the predetermined linear strand speed (in practice determined by a timer) the packaging controls take over to match the rate of linear strand collection with the rate of linear strand feed during package build as herein disclosed.

The secondary controls also operate during shut down of the apparatus at the end of each of the packaging cycles.

At the end of a packaging cycle, a solenoid valve 211 (see FIG. 12) controlling the supply of air under pressure to the clamps of the disc brake assembly 132 is actuated to supply air to the brake 132. Simultaneously electrical energy to the motor 44 and the clutch 102 is stopped. Consequently, the collet 80 is rapidly decelerated by the braking influence of the disc brake assembly 132.

With the rapid deceleration of the collet 80, the pulling wheel 40 would, without control, overfeed the strands 26 and 28 to the collet 80. Slack would develop in the strands that would cause them to be wrapped ("licked") about the circumferential surface of the rotating pull wheel 40. The strands 26 and 28 would break.

The short term controls are again brought into operation. These controls keep the rate of linear strand feed matched to the rate of linear strand collection during rapid deceleration at the end of each package cycle. The short term controls operate during deceleration to keep the rate of linear strand feed and collection matched as they do during the acceleration at start-up of each package cycle.

At a selected slow linear strand speed, normally less than 300 feet-per-minute, electrical energy is interrupted to the solenoid valve 211 of the brake 132. The collet 80 and pull wheel 40 freely rotate at slow r.p.m.'s.

The operator can sever the strands 26 and 28 and place the severed strands between the moving surfaces of the rotating pull rolls 136 and 137. These rolls advance the strand downwardly to a scrap collection zone through the opening 138 in the floor below the rolls.

The operator removes the completed packages 72 and 74 and telescopes new collecting tubes onto the collet 80.

Advancement of the strands 26 and 28 by the pull rolls 136 and 137 keeps the strands moving across the pulling wheel 40 in condition for the next packaging cycle. And attenuation of the filaments 20 from the molten streams 16 continues. Thus, more stable thermal conditions are kept in the feeder 10.

Figure 14:
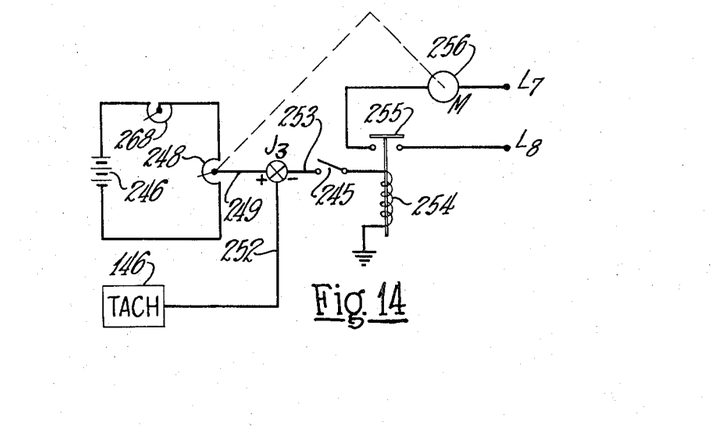
FIG. 14 is an embodiment of controls used to maintain the strand traversing apparatus of the winder shown in FIGS. 1 through 3 at a predetermined spaced relationship with winding packages.

FIG. 14 illustrates overall controls for the apparatus.

At start-up an operator closes main switch 214 to supply electrical energy to the control circuit. Electrical energy is supplied to the control circuit at $L_5$ and $L_6$ by a commercial source.

Next the operator closes a switch 216 to supply electrical energy to the pull roll motor 139, which drives the rolls 136 and 137. Electrical current passes through closed contacts timer T2-2 to energize a control relay M2 that closes control contacts to complete the electrical supply circuit to the motor 139.

The operator places the strands 26 and 28, which have been placed over the pulling wheel apparatus, between the rotating rolls 136 and 137. These rolls advance the strands 26 and 28 downwardly through the openings 138 in the floor. The operator also moves the strand traversing support housing 90 of the winder 70 for package start-up as more fully explained hereinafter. Moving the supporting housing 90 to its package start location effects closure of the switch 218.

The operator then closes motor drive switch 219 to energize the winder motor 104. Upon closure of the switch 219 a control relay M1 is energized to close control contacts that complete the electrical supply circuit to the motor 104. A device, designated OL, is an overload device for the motor 104. Relay M1 also closes holding contact M1-1 to keep itself energized.

The operator presses a foot switch 220 to move it from engagement with a contact 221 into engagement with a contact 222. Engaging the contact 222 energizes a control relay CR3 through normally closed contacts CR1-1 and closed switch 218. The energized relay CR3: (1) closes contacts CR3-1 to prepare for energizing a control relay CR2; (2) closes holding contacts CR3-2 to keep itself energized and (3) opens normally closed contacts CR3-3.

The operator releases the foot switch 220 to engage contact 221 again and thereby energize the relay CR2; the relay remains energized through holding contacts CR3-1.

Engaging contact 222 by the switch 220 also supplies electrical energy to the brake 190 through closed contacts T2-3 and CR1-4.

The energized control relay CR2 begins a timer T1 by closing normally open contacts CR2-1. The timer T1 is set to time out when the pulling wheel 40 and collet 80 arrive at the selected angular operating speeds, i.e. when the strands 26 and 28 are traveling at the predetermined linear speed.

Further, closing contacts CR2-1 effects electrical energy to the eddy-current clutch 106 through the clutch power supply and the pull wheel motor 44 at a reduced voltage through variable resistance 223, which is set to provide a desired voltage to the motor 44. The pulling wheel 40 and collet 80 immediately begin to accelerate towards their operating speeds.

Immediately upon closing the contacts CR2-1, the operator wraps the strands 26 and 28 around the outward end of the rotating collet 80.

The short term or secondary controls operate to keep the linear strand feed speed by the pulling wheel 40 in conformity with the linear strand collection speed by the collet 80.

When the timer T1 times out, it closes contacts T1-1 to energize timer T2 and to energize a control relay CR4.

The operator engages the strands 26 and 28 in the traversing guides 88.

The energized relay CR4 switches control from the short term controls to the packaging controls by effecting closure of contacts (switch 167 in FIG. 6), and by opening contacts T2-3. Electrical energy to the secondary controls is stopped by opening the contacts T2-3.

The timer T2 is set to time out at the end of package formation.

The electrically energized timer T2 opens contacts T2-2 to stop the motor 139 and hence to stop rotation of the rolls 136 and 137.

When timer T2 times out, it closes contacts T2-1 to light a lamp 224 and closes contacts T2-2 to begin rotation of the rolls 136 and 137 by energizing the motor 139.

Upon seeing the lighted lamp 224 the operator closes a stop switch 226 to energize a control relay CR1 and the solenoid 227 of the valve 211 controlling air supply to the disc brake assembly 132.

Closing switch 226 switches control back to the secondary controls. The energized relay CR1 opens normally closed contacts CR1-1, which de-energizes controlled relays CR2 and CR3. Hence, relay CR4 is de-energized to open the switch 167; electrical energy is supplied to the secondary controls through normally closed rotary centrifugal switch 228 and normally closed contacts CR3-3.

Rotational energy to the collet 80 and pull wheel 40 is stopped; contacts CR2-1 are open.

The brake assembly 132 slows rotation of the collet 80.

The energized relay CR1 also closes holding contacts CR1-3 to keep itself energized. And the energized relay CR1 closes contacts CR1-2 to increase the degree of braking effected by the pull wheel brake 190. Contacts CR1-1 and CR1-4 are opened.

At a selected slow collet r.p.m. the rotary centrifugal switch 288 opens. All braking stops (both from the assembly 132 and the brake 190). The operator pushes the scrap roll switch 216 and severs the strands 26 and 28. He places the strands 26 and 29 between the rotating rolls 136 and 137. He then removes the completed packages 72 and 74 and telescopes fresh tubes 76 and 78 on the collet 80.

The operator can begin a new packaging cycle.

Other secondary control means may be used to regulate the linear rate of strand feed. For example, one might regulate frequency of the electrical power supply to the motor 44 in response to sensed differences in the rate of linear strand feed and collection. Moreover, if a DC motor is used to rotate the pulling wheel 40, DC voltage to the motor can be regulated.

Also, one can use other types of transducers as explained in relation to the packaging controls.

If during package build the strand feed and collection speeds become badly mismatched, the compensator arm 56 can close a switch 230 (see FIG. 13), which energizes the control relay CR1 and winder brake solenoid 227 just as though the switch 226 had been closed by the operator.

The winder 70 senses the angular speed of the collet 80 as an indication of the size of the packages 72 and 74 during collection and includes means responsive to sensed angular speed for effectively moving the strand traversing apparatus 82 away from the collet 80 to maintain the traversing guides 88 in predetermined spaced relation to their respective packages throughout collection of the packages. The hooked guides 88 move the engaging strands 26 and 28 with them as the hooks move with the support arrangement during collection of the packages.

Controlling the relationship between the packages 72 and 74 and strand traversing apparatus promotes improved strand control throughout package build and hence improved package build.

As more clearly seen in FIGS. 2 and 3, the carriage 130 is movable on the winder 70. And the cam housing 90 is carried by the carriage 130. Hence, the housing 90 moves with the carriage 130. The cam housing 90 and carriage 130 move horizontally.

As shown the carriage 130 includes a base 240 in addition to the vertical end plate 128. The carriage 130 slides lengthwise on two horizontal parallel support rods, rods 241 and 242, that are stationary within the winder 70. These rods extend through passageways in the base 240; the passageways extend in a direction perpendicular to the axis of the collet 80 (packages 72 and 74). Hence, the carriage 130 and cam housing 90 are movable in a horizontal plane towards and away from the collet 80 in a direction perpendicular to the axis of the collet 80. The winder frame 92 includes an elongated opening 243 permitting movement of the strand traversing apparatus 82 (cam housing 90).

FIGS. 13 through 16 show controls for positioning the carriage 130 throughout package build-up to keep a predetermined spaced relationship between the packages 72 and 74 and the strand traverse guides 88. A switch 245 completes the control circuit. The switch 245 can be manually closed to complete the circuit or automatically closed to complete the circuit when the collet 80 arrives at operating speed to begin package collection. Referring to FIG. 14, a battery 246 supplies a constant positive DC voltage to a potentiometer 248. The output voltage of the potentiometer 248 travels to a summing junction $J_3$ through a lead 249. The tachometer 146 provides a negative DC signal to the junction $J_3$ through a lead 252. When the voltage supplied to the junction $J_3$ are unbalanced, the junction $J_3$ supplies an electrical signal through an output lead 253 (through switch 245) to a grounded solenoid coil or electromagnet 254 that operates to close a normally open armature switch 255. The switch 255 is in a circuit supplying electrical energy to a motor 256; a suitable commercial electrical source supplies electrical energy to the circuit across $L_7$ and $L_8$. The motor 256 is energized when the armature 255 is closed.

The energized motor 256 concurrently drives the slider of the potentiometer 248 and actuates a drive system that moves the carriage 130.

When the voltage from the potentiometer 248 and the tachometer 146 are equal, there is no electrical output from the junction $J_3$; hence, the armature switch 255, which is normally open, remains open. As the voltage from the tachometer 146 decreases from the decreasing angular output speed of the clutch 106, the solenoid coil 254 becomes energized from the high voltage into the junction $J_3$ from the potentiometer 248. The coil 254 closes the armature switch 255; and the motor 256 effects movement of the slider of the potentiometer 248 to reduce potentiometer output voltage until the output voltage is equal to the output voltage from the tachometer 146. The solenoid coil 254 then becomes de-energized. The armature switch 255 opens and the motor 256 becomes de-energized.

Figure 15:
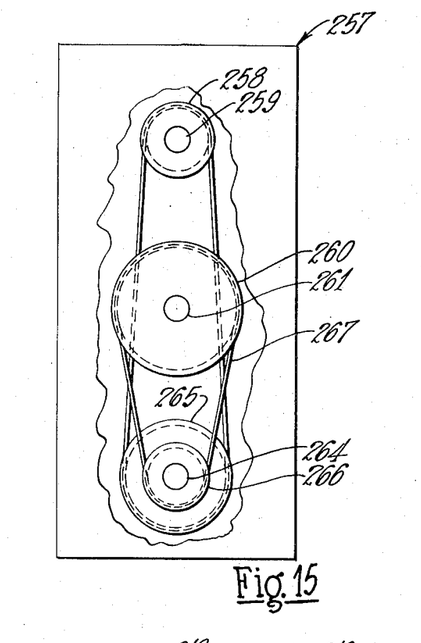
FIG. 15 is a view in elevation of drive apparatus for moving the strand traversing support of the winder shown in FIGS. 1 through 3.
Figure 16:
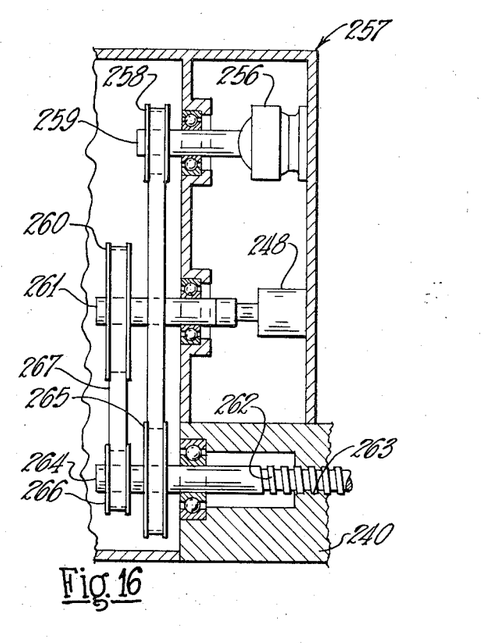
FIG. 16 is a side elevation view of the apparatus shown in FIG. 15.

FIGS. 14 and 15 show more of the strand traverse position control apparatus in a control box 257 mounted on the base 240 of the carriage 130. Mounted near the top of the control box 257 is the electric motor 256 with a sheave 258 on the output shaft 259 of the motor 256. Mounted below the motor 256 in the control box 257 is the potentiometer 248 with a sheave 260 on a slider control shaft 261 of the potentiometer. At the bottom region of the conrol box is a carriage drive including a rotatably mounted drive screw 262 in a threaded passageway 263 in the base 240 of the carriage 130. An unthreaded portion 264 of the drive screw 262 carries sheaves 265 and 266.

The energized motor 256 rotates the drive screw 262 and moves the slider of the potentiometer 248. A belt riding in sheaves 258 and 265 connects the motor output shaft 259 with the drive screws 262. A belt 267 riding in sheaves 260 and 266 connect the drive screw with the slider control shaft 261.

As the motor 256 rotates, the slider control shaft 261 moves the slider of the potentiometer 248 and the drive screw 262. The rotating drive screw 262 moves the carriage 130 away from the collet 80 (collecting packages) until the potentiometer voltage equals the voltage from the tachometer 146. The coil 254 then becomes de-energized; the switch 255 then opens to de-energize the motor 256.

In practice the motor 256 is a slow r.p.m. motor such as SLO-SYN made by the Superior Electric Company.

An operator can select a desired position relationship between the guides 88 and collection packages, e.g. packages 72 and 74. Because the collet speed at the beginning of package collection is controlled and hence known, an operator can adjust a trim potentiometer 268 to bring the voltage from the potentiometer 248 into balance with the known beginning voltage from the tachometer 146. Hence, the operator moves the cam housing 90 (carriage 130) to a selected location to position the guides 88. Such movement also moves the slider of potentiometer 248. Thus, the operator merely adjusts the trim potentiometer 268 to provide voltage from the potentiometer 248 at the beginning of package build-up that matches the tachometer voltage.

Moving the cam housing 90 (carriage 130), to the selected location at the beginning of package build closes the switch 210 (see FIG. 14).

The idler assembly 120 permits movement of the carriage 130 without parting the drive belts 116 and 118. As shown the idler 120 includes the rotatable idler shaft 119, bearing box 270, position arm 272, support member 274 and support bracket 276.

The support member 274 and bracket 276 hold the bearing box 270 and shaft 119 above the carriage 90. The bearing box 270 is movable about the axis of the support member 274 by swing legs 277 and 278.

The position arm 272 connects the shaft 119 and cam drive shaft 124 to keep these shafts at a constant spaced distance from the belt 118. The arm 272 pushes (swings) the shaft 119 and its gear box upwardly around the axis of shaft support member 274 as the carriage 130 moves towards the collet 80. The reverse is true as the carriage 130 moves away from the collet 80.

The swinging movement of the assembly 120 keeps both the belts 116 and 118 in driving relationship on their respective sheaves.

The winder 70 provides for the slower secondary strand traversing motion by apparatus reciprocating the cam housing 90. Such apparatus includes a motor 280, spur gears 282 and 284, cam 286 and follower 288. In the embodiment shown, the cam 286 is a wheel cam fixed on a rotatable shaft 290. The motor 280 rotates the wheel cam 286 through the meshing spur gears 282 and 284. The follower 288 includes a pin 292 engaging the peripheral groove 294 on the wheel cam 286. The follower 288 is secured on the cam drive shaft 124. As the shaft 290 turns the wheel 286, the wheel reciprocates the follower 288. Hence, the cam wheel 286 reciprocates the cam housing 90 through the follower 288. A conventional spline arrangement (not shown) can be used to permit the shaft 124 to move back and forth along its axis and still be driven in rotation.

One can use various cam wheels to provide secondary strand traversing motions having different stroke lengths. In the embodiments shown in FIGS. 1 and 2 it has been useful to use a short secondary reciprocating stroke length of from ½ inch and less.

The winder 70 is shown in combination with apparatus for modifying the angular speed of the collet 80 (packages 72 and 74) nonlinearly. But the winder 70 can be used with apparatus modifying the angular speed of the collet 80 in a linear fashion. Moreover, the winder 70 can be used to pull linear elements from a source, e.g. pull glass strands without the use of a filament pulling device like the pulling wheel 40.

Figure 17:
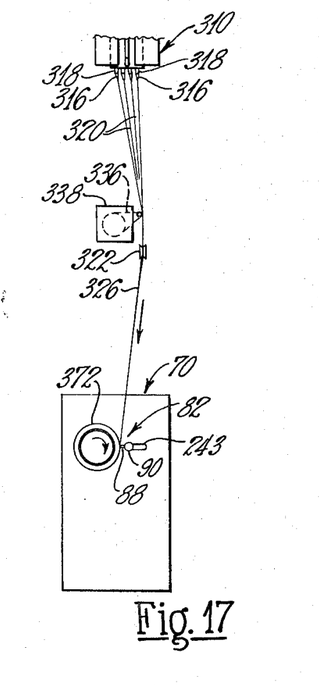
FIG. 17 is a simplified front view in elevation of a continuous glass filament forming apparatus using the winder shown in FIGS. 1 through 3. The winder is shown without use of a rotary filament pulling device.
Figures 18, 19:
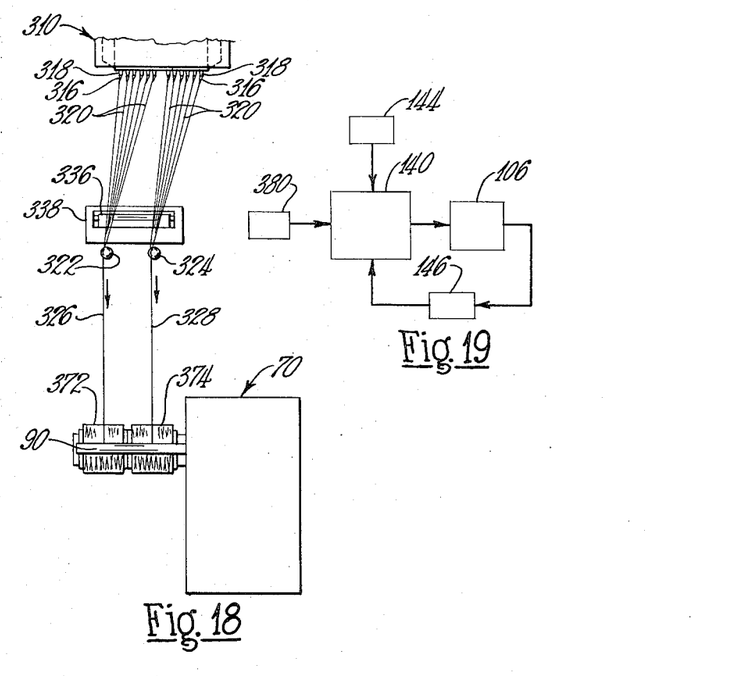
FIG. 18 is a side view in elevation of the apparatus shown in FIG. 16.
FIG. 19 is a simple diagram of controls for the apparatus shown in FIGS. 16 and 17.

FIGS. 17 and 18 illustrate the winder 70 without a pulling arrangement above it. As shown a feeder 310 supplies molten glass streams 316 from tips 318. The winder 70 withdraws continuous glass filaments 320 from the streams 316. Gathering shoes 322 and 324 combine the filaments 320 into two strands, i.e. strands 326 and 328. A sizing applicator 336 held in a housing 338 applies liquid sizing or other coating material. The strands 322 and 324 wind as packages 372 and 374.

In the embodiment shown in FIGS. 17 and 18 one can use known ways to modify the speed of strand collection as the packages 372 and 374 increase in size. FIG. 19 shows a control using the controller 140 without a transducer. In FIG. 19 a source of DC voltage 380 supplies a constant voltage input to the integrator 150.

We claim:

1. In apparatus for processing a linear bundle of thermoplastic filaments including rotary means for linearly feeding the bundle and rotary means for collecting the fed bundle in which during a change in linear speed of the bundle by the feeding and collecting means over a short time in comparison to the overall processing time the average rate of change by the rotary feeding means is greater than the average rate of change by the rotary collection means, the combination comprising:
 a sensor for detecting changes in the length of the linear bundle between the rotory feeding means and the rotary collecting means established by differences in the rate of linear feed and the rate of linear collection of the bundle;
 first control means effective in response to the sensed differences in the length of the bundle during the change in linear speed of the bundle to modify the speed of the rotary feeding means to bring the rate of feed of the material into conformity with the rate of collection of the material;
 second control means for matching the rate of linear feed and collection of the bundle during time the first control means is not in operation; and
 means for switching between the first control means and the second control means.

2. In apparatus for producing glass strand including means for supplying streams of molten glass for attenuation into continuous glass filaments, means for combing the filaments into a strand, rotary means for attenuating the filaments from the streams and for feeding the strand, and rotary means for collecting the fed strand as a wound package in which during a change in linear strand speed by the rotary feeding and rotary collecting means the average rate of change by the rotary collection means, the combination comprising:
 a sensor for detecting differences between the rate of linear feed and rate of linear collection of the strand by sensing the changes in the length of the strand between the rotary feed and rotary collection means;
 secondary control means effective in response to the sensed differences between the rate of linear strand feed and collection during the change in linear strand speed to modify the angular speed of the rotary feeding means to bring the rate of strand feed into conformity with the rate of strand collection;
 primary control means for matching the rate of linear strand feed and collection during the time the secondary control means is not in operation; and
 means for switching between the secondary control means and the primary control means during formation of the package.

3. In apparatus for producing glass strand including means for supplying streams of molten glass for attenuation into continuous glass filaments, means for combining the filaments into a strand, rotary means for attenuating the filaments from the streams and for feeding the strand, and rotary means for collecting the fed strand as a wound package in which during a change in linear strand speed to a predetermined linear strand speed the average rate of change by the rotary feed means is greater than the average rate of change collection by the rotary collection means, the combination comprising:
 means for sensing differences between the rate of linear feed and rate of linear collection of the strand;
 secondary control means effective in response to the sensed differences between the rate of linear strand feed and collection during the change in linear strand speed to modify the speed of the feeding means to bring the rate of strand feed into conformity with the rate of strand collection;
 primary control means effective in response to the sensed differences between the rate of linear feed and collection to modify the speed of the collection means to bring the rate of linear strand collection into conformity with the rate of linear feed during the time the secondary control means is not in operation; and
 means for switching between the secondary control means and the primary control means during formation of the package.

4. In apparatus for producing glass strand including means for supplying streams of molten glass for attenuation into continuous glass filaments, means for combining the filaments into a strand, rotary means for attenuating the filaments from the streams and for feeding the strand, and rotary means for collecting the fed strand as a wound package in which during a change in linear strand speed the rotary feed means delivers strand at a linear rate greater than the rate of collection by the rotary collection means, the combination comprising:
 means for sensing differences between the rate of linear feed and rate of linear collection of the strand;
 secondary control means for keeping the linear rate of strand feed and collection in matched relationship during the change in strand speed including means for restraining the rotary feed means to slow the rate of linear strand feed and means effective in response to the sensed differences between the rate of linear strand feed and collection to modify the influence of the restraining means on the rotary feed means to bring the rate of strand feed into conformity with the rate of strand collection;
 primary control means for matching the rate of linear strand feed and collection during the time the secondary control means is not in operation; and
 means for switching between the secondary control means and the primary control means during formation of the package.

5. In apparatus for packaging strand of thermoplastic material including rotary means for feeding the strand and rotary means for collecting the fed strand as a wound package in which during a change in linear strand speed over a time that is short in comparison to the time for formation of the package the rotary feed means delivers strand at an average rate of change greater than the average rate of change by the rotary collection means, the combination comprising:
 means for sensing differences between the rate of linear feed and rate of linear collection of the strand;
 secondary control means for keeping the linear rate of strand feed and collection in matched relationship during the change in strand speed including means for restraining the rotary feed means to slow the rate of linear strand feed and means effective in response to the sensed differences between the rate of linear strand feed and collection to modify the influence of the restraining means on the rotary feed means to bring the rate of strand feed into conformity with the rate of strand collection;
 primary control means for matching the rate of linear strand feed and collection during the time the secondary control means is not in operation; and
 means for switching between the secondary control means and the primary control means during formation of the package.

6. Apparatus of claim 5 in which the primary control means includes means for sensing differences between the rate of linear feed and rate of linear collection of the strand and means effective in response to the sensed differences to bring the rate of strand collection into conformity with the rate of strand collection.

7. Apparatus of claim 6 in which the primary and secondary control means include the same sensing means.

8. In apparatus for packaging strand of thermoplastic material including a driven rotatable pulling wheel for feeding the strand and rotary means for collecting the fed strand as a wound package in which during a change in linear strand speed by the feeding wheel and rotary collection means over a short time in comparison to the overall package formation the average rate of change by the feeding wheel is greater than the average rate of change by the collection means, the combination comprising:

means for sensing differences between the rate of linear feed and rate of linear collection of the strand;

a secondary control means for keeping the linear rate of strand feed and collection in matched relationship during the change in strand speed including means for restraining the feeding wheel to slow the rate of linear strand feed and means effective in response to the sensed differences between the rate of linear strand feed and collection to modify the influence of the restraining feeding wheel to bring the rate of strand feed into conformity with the rate of strand collection;

primary control means for keeping the rate of linear strand feed and collection in matched relationship during time the secondary control means is not in operation and including means for supplying a control signal having a patterned rate of change that is effective to modify the rotational speed of the rotary collection means during package build-up to cause the linear rate of collection of the material to approach in general the linear rate of feed of the material, and means effective in response to the sensed differences between the linear rate of feed and linear rate of collection to change the patterned rate of change of the control signal to bring the linear rate of collection of the strand into conformity with the actual linear rate of feed of the strands; and means for switching between the secondary control means and the primary control means.

9. In apparatus for packaging strand of thermoplastic material including rotary means for feeding the strand and rotary means for collecting the fed strand as a wound package in which during start-up the average acceleration of the strand by the rotary feed means is greater than the average acceleration of the rotary collection means from rest to a predetermined linear strand speed, the combination comprising:

means for sensing differences between the rate of linear feed and rate of linear collection of the strand;

start-up control means for keeping the rate of linear strand feed and collection in matched relationship during acceleration of the strand to the predetermined linear strand speed including means for restraining the feed means to slow the rate of the rotary feed means and means effective in response to the sensed differences between the rate of linear feed and collection to the strand to modify the influence of the restraining means on the rotary feed means to bring the rate of strand feed into conformity with the rate of strand collection;

packaging control means for keeping the rate of linear strand feed and collection in matched relationship after the strand speed has reached the predetermined speed; and means for switching from the start-up control means to the packaging control means after the strand has attained the predetermined speed.

10. Apparatus of claim 9 in which the switching means is automatic.

11. Apparatus of claim 10 in which the switching means includes a timer.

12. Apparatus of claim 11 in which the restraining means is a brake.

13. Apparatus of claim 12 in which the brake is a magnetically actuated friction brake.

14. Apparatus of claim 13 in which the sensing means engages the strand between the strand feeding means and strand collecting means.

15. Apparatus of claim 14 in which the sensing means comprises a pivotally mounted member, a guide on a free end of the member for engagement with the strand and means for biasing the member to establish a selected tension in the strand.

16. In apparatus for packaging strand of thermoplastic material including a driven rotatable pulling wheel for feeding the strand and rotary means for collecting the fed strand as a wound package in which during start-up the average acceleration of the strand by the feed wheel is greater than the average acceleration by the rotary collection means from rest to a predetermined linear strand speed, the combination comprising:

means for sensing differences between the rate of linear feed and the rate of linear collection of the strand;

start-up control means for keeping the rate of linear strand feed and collection in matched relationship during acceleration of the strand to the predetermined linear strand speed including means for restraining the feed wheel to slow the rate of strand feed and means effective in response to the sensed differences between the rate of linear feed and collection of the strand to modify the influence of the restraining means on the feed wheel to bring the rate of strand feed into conformity with the rate of strand collection;

packaging control means for keeping the rate of linear strand feed and collection in matched relationship after the strand speed has reached the predetermined speed including means for supplying a control signal having a patterned rate of change that is effective to modify the rotational speed of the rotary collection means during package build-up to cause the linear rate of collection of the material to approach in general the linear rate of feed of the material and means effective in response to the sensed differences between the linear rate of feed and linear rate of collection to change the patterned rate of change of the control signal to bring the linear rate of collection of the strand into conformity with the actual linear rate of feed of the strand; and means for switching from the start-up control means to the packaging control means after the strand has attained the predetermined speed.

17. In apparatus for producing glass strand including means for supplying streams of molten glass for attenuation into continuous glass filaments, means for combining the filaments into a strand, a driven rotatable wheel for attenuating continuous glass filaments from the streams and for feeding the strand, and rotary means for collecting the fed strand as a wound package in which during start-up the average acceleration of the strand by the feeding wheel is greater than the average acceleration by the rotary collection means from rest to a predetermined linear strand speed, the combination comprising:

means for sensing differences between the rate of linear feed and the rate of linear collection of the strand;

start-up control means for keeping the rate of linear strand feed and collection in matched relationship during acceleration of the strand to the predetermined linear strand speed including means for braking the feeding means to slow the rate of the feed wheel and means effective in response to the sensed differences between the rate of linear feed and collection of the strand to modify the influence of the braking means on the feed wheel to bring the rate of strand feed into conformity with the rate of strand collection;

packaging control means for keeping the rate of linear strand feed and collection of the strand in matched relationship after the strand speed has reached the predetermined speed including means for supplying a control signal having a patterned rate of change that is effective to modify the rotational speed of the rotary collection means during package build-up to cause the linear rate of collection of the material to approach in general the linear rate of feed of the material and means effective in response to the sensed differences between the linear rate of feed and linear rate of collection to change the patterned rate of change of the control signal to bring the linear rate of collection of the strand into conformity with the actual linear rate of feed of the strand; and means for switching from the start-up control means to the packaging control means after the strand has attained the predetermined speed.

18. In apparatus for packaging strand of thermoplastic material including rotary means for feeding the strand and rotary means for collecting the fed strand as a wound package in which during slow down the average deceleration of the strand by the rotary feed means is less than the average deceleration by the rotary collection means to a predetermined linear strand speed, the combination comprising:

means for sensing differences between the rate of linear feed and the rate of linear collection of the strand;

control means for keeping the rate of linear strand feed and collection in matched relationship during deceleration of the strand to the predetermined linear strand speed including means for restraining the rotary feeding means to slow the rate of linear strand feed and means effective in response to the sensed differences between the rate of linear strand feed and collection to modify the influence of the restraining means on the rotary feeding means to bring the rate of strand feed into conformity with the rate of strand collection;

packaging control means for matching the linear rate of strand feed and collection before slow down has begun; and means for switching between the control means and the packaging control means.

19. In apparatus for producing glass strand including means for supplying streams of molten glass for attenuation into continuous glass filaments, means for combining the filaments into a strand, a driven rotatable wheel for attenuating continuous glass filaments from the streams and for feeding the strand, and rotary means for collecting the fed strand as a wound package in which during slow down the average deceleration of the strand by the feed wheel is less than the average deceleration of the rotary collection means to a predetermined linear strand speed, the combination comprising:

means for sensing differences between the rate of linear feed and the rate of linear collection of the strand;

slow down control means for keeping the rate of linear strand feed and collection in matched relationship during deceleration of the strand to the predetermined linear strand speed including means for braking the feed wheel to slow the rate of linear strand feed and means effective in response to the sensed differences between the rate of linear strand feed and collection to modify the influence of the braking means on the feed wheel to bring the rate of strand feed into conformity with the rate of strand collection;

packaging control means for matching the linear rate of strand feed and collection before slow down has begun including means for supplying a control signal having a patterned rate of change that is effective to modify the rotational speed of the rotary collection means during package build-up to cause the linear rate of collection of the material to approach in general the linear rate of feed of the material and means effective in response to the sensed differences between the linear rate of feed and linear rate of collection to change the patterned rate of change of the control signal to bring the linear rate of collection of the strand into conformity with the actual linear rate of feed of the strand; and means for switching between the slow down control means and the packaging control means.

20. The apparatus of claim 1 further including means for establishing a preselected tension in the linear bundle during its advancement.

21. Apparatus of claim 1 in which the sensor includes movably mounted arm for engagement with the linear bundle during advancement thereof and in which the first control means is responsive to changes in the position of the arm means from changes in the length of the linear bundle between the rotary feed and rotary collection means.

22. The apparatus of claim 21 in which the arm is pivotally mounted about an axis.

23. Apparatus of claim 22 further including biasing means acting on the arm to effectively urge the arm to establish a preselected tension in the linear bundle during advancement thereof over the arm.

24. Apparatus of claim 22 in which the biasing means is a spring.

References Cited

UNITED STATES PATENTS

| 3,279,904 | 10/1966 | Russell et al. | 65—11 W |
|---|---|---|---|
| 3,471,278 | 10/1969 | Greim | 65—11 W |
| 3,582,298 | 6/1971 | Trethewey | 65—11 W |
| 3,650,717 | 3/1972 | Canfield | 65—11 W |
| 3,652,243 | 3/1972 | Jensen et al. | 65—2 |

ROBERT L. LINDSAY, Jr., Primary Examiner

U.S. Cl. X.R.

65—29, 158; 242—18 G